March 2, 1948.　　　A. C. SCHULZ　　　2,437,050
DAMPENING ROLLER
Filed Feb. 5, 1945
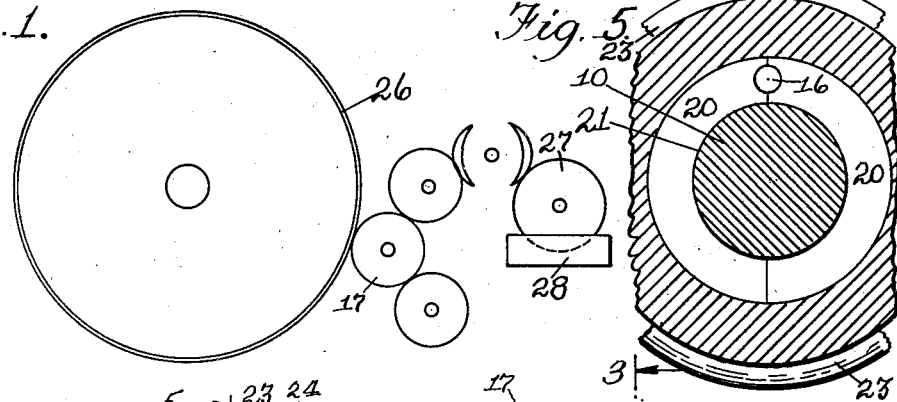
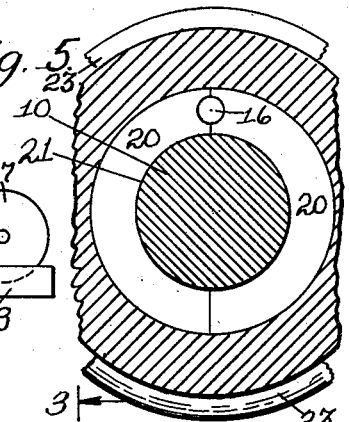
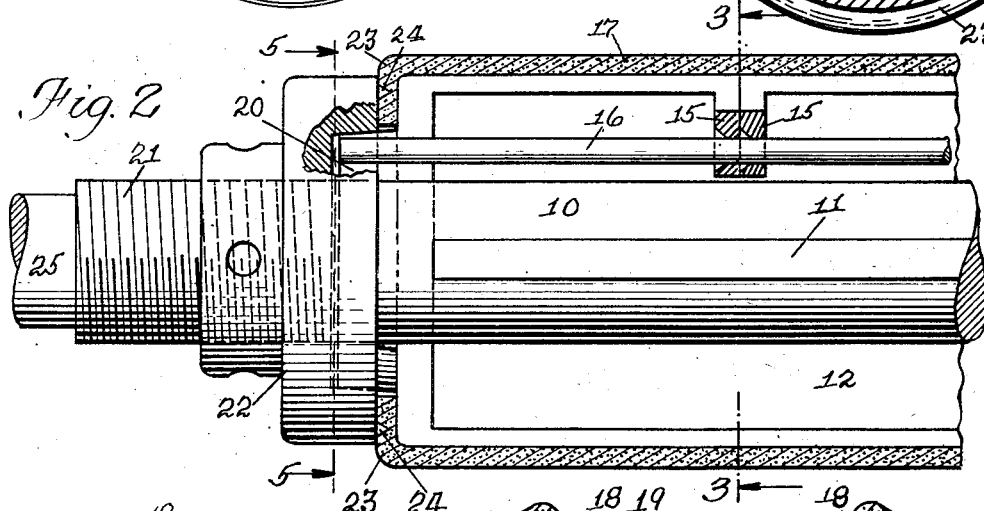
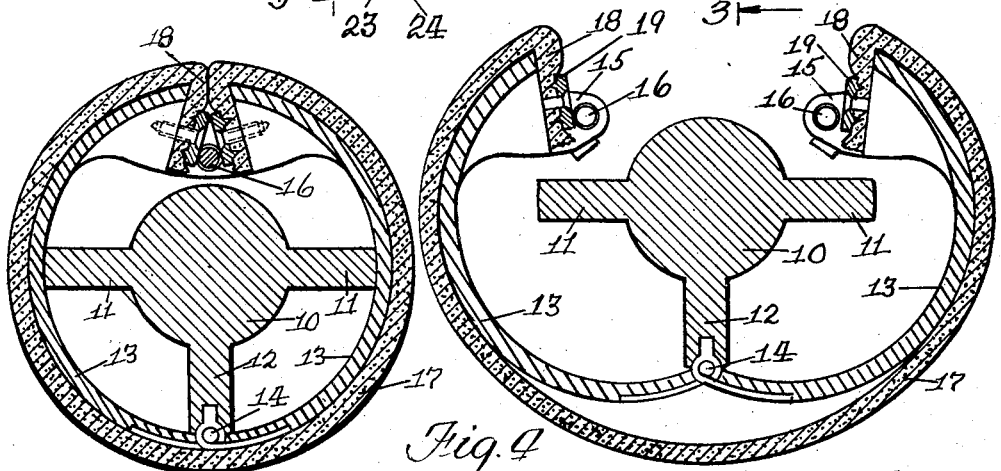
Inventor:
Armand C. Schulz
By: Brayton Richards
Attorney Patented Mar. 2, 1948

2,437,050

UNITED STATES PATENT OFFICE 2,437,050

DAMPENING ROLLER

Armand C. Schulz, Milwaukee, Wis.

Application February 5, 1945, Serial No. 576,275

3 Claims. (Cl. 91—67.8)

The invention relates to improvements in dampening rollers adapted to be used on printing presses and has for its primary object the provision of an improved dampening roller which is of simple construction and highly efficient in use.

Other objects will appear hereinafter.

The invention consists of the combinations and arrangement of parts hereinafter described and claimed.

The invention will be best understood by reference to the accompanying drawings forming a part of this specification and in which—

Fig. 1 is a diagrammatic view illustrating a position of use of the dampening roller as applied to the plate cylinder of an ordinary printing press;

Fig. 2, a partial longitudinal section of a dampening roller embodying the invention on an enlarged scale;

Fig. 3, a section taken substantially on line 3—3 of Fig. 2;

Fig. 4, a view similar to Fig. 3 but showing the sections of the dampening roller in open relation; and Fig. 5, a partial section taken substantially on line 5—5 of Fig. 2.

The embodiment of the invention illustrated in the drawings comprises a longitudinal steel shaft 10 having diametrically opposed longitudinal ribs 11 and an intermediate longitudinal rib 12, as shown. Two semi-cylindrical aluminum roller sections 13 are hinged at 14 to the rib 12 and are thus arranged to be closed into contact with the outer ends of the ribs 11, as indicated in Fig. 3, or opened as indicated in Fig. 4. The sections 13 are provided at their free edges with a series of perforated overlapping registering lugs 15 and the securing rod 16 is arranged to be inserted through the perforations in said lugs to hold said roller sections 13 in closed relation, as indicated. The roller thus provided is covered with a covering 17 of the usual absorbent material employed for the purpose on dampening rollers, the longitudinal edges 18 of said covering being turned in around the free edges of the sections 13 and secured to the lugs 15 by means of clamping bars 19, as shown.

The roller sections 13 are provided at each end with complementary hub sections 20, which are tapered outwardly as best shown in Fig. 2, and the exposed ends of shaft 10 are threaded at 21 to receive threaded securing caps 22 having tapered sockets at their inner ends fitting snugly over the hub sections 20 to hold the roller sections 13 further in closed relation, as will be readily understood and as indicated in Fig. 2. The end edges 23 of the covering 17 are turned inwardly around the ends of the roller sections 13 and are held in place by the caps 22, said caps being provided with annular V-shaped ribs 24 for the purpose. The shaft 10 is provided at each end with a bearing extension 25, by means of which the dampening roller may be mounted in the usual bearings provided for the purpose on a printing press, and whereby the dampening roller may be arranged in contact with the plate cylinder 26 of an ordinary printing press and cooperate with the usual fountain roller 27 and fountain 28, as will be readily understood by those skilled in this art. In this way a dampening roller for printing presses is provided in which the dampening covering or cloth is securely clamped thereto with an even tension over the entire surface of the roller and without any bulging ends. Owing to the uniformity and evenness of the roller covering, a lithographic plate can be kept sufficiently dampened for good working conditions by the use of but one dampening roller placed in any of the usual or conventional positions in contact with the plate. The uniform thickness of the roller covering will prevent any tendency of the same to creep around the roller and thus become loosened therefrom. The specific form and arrangement of parts illustrated is a simple and effective one for the purpose.

While I have illustrated and described the preferred form of construction for carrying my invention into effect, this is capable of variation and modification without departing from the spirit of my invention. I therefore do not wish to be limited to the precise details disclosed, but desire to avail myself of such variations and modifications as fall within the scope of the appended claims.

I claim:

1. A dampening roller comprising a longitudinal bearing shaft having three spaced radially extending longitudinal ribs; two semi-cylindrical roller sections hinged along one longitudinal edge to the central of said ribs and arranged to swing into and out of contact with the other ribs; complementary hub sections arranged at the ends of the two semi-cylindrical roller sections; and a holding cap threaded on each end of said longitudinal bearing shaft and arranged to engage over said complementary hub sections when in closed relation; an absorbent covering for the two semi-cylindrical roller sections having its longitudinal edges turned in around the longitudinal edges of said sections; and means for securing said sections in closed relation.

2. The construction specified in claim 1 in which the end edges of said absorbent covering are turned in around the ends of the semi-cylindrical sections and means associated with said holding cap to engage said inturned end edges when said cylindrical sections are in closed relation.

3. The construction specified in claim 1 in which the longitudinal edges of the semi-cylindrical roller sections have perforated registering lugs provided at their inner sides, a locking rod insertable through said lugs to hold said sections in closed relation, the end edges of said covering are turned in around the ends of said sections, the ends of said sections are provided with complementary hub sections, and a holding cap is threaded on said shaft and arranged to engage over said hub sections when in closed relation and engage said inturned end edges.

A. C. SCHULZ.

REFERENCES CITED

The following references are of record in the file of this patent:

UNITED STATES PATENTS

| Number | Name | Date |
|---|---|---|
| 868,021 | Scott | Oct. 15, 1907 |
| 917,068 | Hodskinson | Apr. 6, 1909 |
| 2,135,150 | Schmidt | Nov. 1, 1938 |
| 2,247,081 | Fears | June 24, 1941 |
| 2,356,007 | Sanders | Aug. 15, 1944 |